US012722815B2

(12) United States Patent
Mihm et al.

(10) Patent No.: US 12,722,815 B2
(45) Date of Patent: Sep. 1, 2026

(54) HANGAR FOR AT LEAST ONE UNMANNED AERIAL VEHICLE

(71) Applicant: Björn Steiger Stiftung (Stiftung des bürgerlichen Rechts), Winnenden (DE)

(72) Inventors: Andreas Mihm, Radolfzell (DE); Joachim von Beesten, Duesseldorf (DE)

(73) Assignee: BJÖRN STEIGER STIFTUNG (STIFTUNG DES BÜRGERLICHEN RECHTS), Winnenden (DE)

( * ) Notice: Subject to any disclaimer, the term of this patent is extended or adjusted under 35 U.S.C. 154(b) by 0 days.

(21) Appl. No.: 18/927,330

(22) Filed: Oct. 25, 2024

(65) Prior Publication Data

US 2025/0136307 A1 May 1, 2025

(30) Foreign Application Priority Data

Oct. 27, 2023 (DE) ..................... 10 2023 129 804.6

(51) Int. Cl.

*B64U 80/70* (2023.01)
*B64U 80/10* (2023.01)
*E04H 6/44* (2006.01)

(52) U.S. Cl.

CPC ............. *B64U 80/70* (2023.01); *B64U 80/10* (2023.01); *E04H 6/44* (2013.01)

(58) Field of Classification Search

CPC .......... B64U 80/70; B64U 80/10; E04H 6/44; B64F 1/222; B25J 11/00

See application file for complete search history.

(56) References Cited

U.S. PATENT DOCUMENTS 9,139,310 B1 * 9/2015 Wang ..................... G05D 1/102
9,222,493 B2 * 12/2015 Riskas .................. F15B 21/085
9,718,564 B1 * 8/2017 Beckman ............ B61L 15/0027
9,776,717 B2 * 10/2017 Spinelli .................. B64U 70/20
10,384,692 B2 * 8/2019 Beckman ................ B61L 27/14
10,421,542 B2 * 9/2019 Beckman ................. B61D 3/16
10,538,340 B1 * 1/2020 Roup .................... B61L 23/041
(Continued)

FOREIGN PATENT DOCUMENTS

CN 214420705 U 10/2021
CN 110606220 B 9/2022
(Continued)

*Primary Examiner* — Medhat Badawi
(74) *Attorney, Agent, or Firm* — McCoy Russell LLP

(57) ABSTRACT

The present disclosure relates to a hangar for at least one unmanned aerial vehicle, comprising: an interior, which is delimited by a lower side, an upper side and at least one side part, at least one manipulator arm in the interior, wherein the manipulator arm is designed to transport the at least one unmanned aerial vehicle through a closable opening in the at least one side part from the interior to the outer upper side of the hangar and/or wherein the manipulator arm is configured to transport the at least one unmanned aerial vehicle through a closable opening in the at least one side portion from the outer top of the hangar into the interior, wherein the manipulator arm is programmable and/or adapted to transport different unmanned aerial vehicles having different characteristics. Furthermore, the present disclosure relates to a system comprising at least two hangars.

14 Claims, 8 Drawing Sheets

(56) References Cited

U.S. PATENT DOCUMENTS 10,676,107 B2 * 6/2020 Beckman ................ B61L 27/14
10,974,911 B2 * 4/2021 Zevenbergen ......... B65G 47/92
11,427,229 B2 * 8/2022 Beckman ............. G06Q 10/083
11,634,221 B2 * 4/2023 Chen ....................... F24H 15/25
244/110 E
11,689,008 B1 * 6/2023 Nichols .................... H02G 7/02
254/134.5
11,738,867 B2 * 8/2023 Ehasoo ................... B60L 53/00
244/17.11
11,823,578 B2 * 11/2023 Gur ..................... B61L 15/0072
11,884,422 B2 * 1/2024 Lowe ................. H05K 7/20436
11,993,294 B2 * 5/2024 Beckman ............... B64U 70/90
12,049,328 B2 * 7/2024 Sweeny ................. B64U 80/70
12,451,017 B2 * 10/2025 Huda ....................... G08G 5/30
2003/0226222 A1 * 12/2003 Stolk .................. B65G 69/2817
14/71.7
2005/0006266 A1 * 1/2005 Kurikawa ................. G03F 1/66
430/4
2006/0249622 A1 * 11/2006 Steele .................... B64U 80/20
244/115
2016/0039542 A1 * 2/2016 Wang ..................... B64U 50/37
244/114 R
2016/0137404 A1 * 5/2016 Steiner ..................... B61D 9/14
220/1.5
2017/0096222 A1 * 4/2017 Spinelli .................. B64U 80/25
2017/0355471 A1 * 12/2017 Joern ...................... B64C 1/069
2018/0245365 A1 * 8/2018 Wankewycz ........... B64U 10/13
2019/0023416 A1 * 1/2019 Borko ..................... G06F 3/041
2019/0193952 A1 * 6/2019 Zevenbergen .......... B60L 53/12
2021/0086367 A1 * 3/2021 Choi ........................ B25J 19/00
2022/0019247 A1 * 1/2022 Dayan .................... G05D 1/104
2022/0305641 A1 * 9/2022 Murphy ................... B25J 9/046
2022/0390964 A1 * 12/2022 Youmans ............. G05D 1/0016
2023/0256537 A1 * 8/2023 Sato ................... B23K 26/0884
700/253
2024/0246226 A1 * 7/2024 Vikas ..................... B25J 9/0009
2024/0400241 A1 * 12/2024 Lede ...................... B64U 80/40
2024/0409871 A1 * 12/2024 Blanchard .......... G01N 15/0227
2025/0000018 A1 * 1/2025 Kave ...................... A01D 34/78
2025/0001592 A1 * 1/2025 Hong ..................... B25J 9/1617
2025/0042576 A1 * 2/2025 Mombrinie ............... B64F 1/00
2025/0136307 A1 * 5/2025 Mihm ....................... E04H 6/44

FOREIGN PATENT DOCUMENTS

CN 110589007 B 2/2023
CN 115610275 B 4/2023
KR 20230117015 A 8/2023
WO 2023182921 A1 9/2023

* cited by examiner 120
118
112
100
106
104
114
104
102
114
114
116
110
108
112

100
110
116
104
104
113
114
102
115
118
114
104
120
104
112
104
106
104
121
119
117
108

HANGAR FOR AT LEAST ONE UNMANNED AERIAL VEHICLE

CROSS REFERENCE TO RELATED APPLICATION

The present application claims priority to German Patent Application No. 10 2023 129 804.6 filed on Oct. 27, 2023. The entire contents of the above-listed application are hereby incorporated by reference for all purposes.

TECHNICAL FIELD

The present disclosure relates to a hangar for at least one unmanned aerial vehicle, comprising at least one manipulator arm for transporting an unmanned aerial vehicle into and/or out of the hangar to its surface.

BACKGROUND

Hangars for unmanned aerial vehicles are already known from the prior art, comprising a device which is suitable for gripping and/or transporting an unmanned aerial vehicle into and/or out of the hangar.

SUMMARY

For example, a hangar for an unmanned aerial vehicle is known from CN214420705U, which comprises, among other things, an extendable gripping device (claw) for a specific unmanned aerial vehicle that is approaching.

CN110589007B discloses a hangar for heavy duty industrial level unmanned aerial vehicles, comprising a mechanical arm for lifting a specific unmanned aerial vehicle upwards, out of the open hangar.

It is the object of the present disclosure to further form a hangar for at least one unmanned aerial vehicle of the type mentioned at the beginning in an advantageous manner, in particular in that the hangar comprises a device which is suitable for gripping and/or transporting unmanned aerial vehicles with different characteristics.

According to the disclosure, this task is solved by a hangar for at least one unmanned aerial vehicle is provided:

- an interior which is defined by a bottom side, a top side and at least one side panel,
- at least one manipulator arm in the interior,
- wherein the manipulator arm is designed to transport the at least one unmanned aerial vehicle through a closable opening in the at least one side part from the interior to the outer upper side of the hangar and/or
- wherein the manipulator arm is designed to transport the at least one unmanned aerial vehicle through a closable opening in the at least one side part from the outer upper side of the hangar into the interior,
- wherein the manipulator arm is programmable and/or set up for the transportation of different unmanned aerial vehicles with different characteristics.

The disclosure is based on the fundamental idea that different unmanned aerial vehicles can be safely positioned, stored and/or released from the hangar. In other words, the manipulator arm and the interior of the hangar are designed such that a wide range of unmanned aerial vehicles to be gripped and/or transported and/or parked is achieved, because the hangar including the manipulator arm and/or the interior has not been specifically configured and/or preprogrammed for an unmanned aerial vehicle design. In particular, this is enabled by a manipulator arm that is designed to safely grip and/or transport different unmanned aerial vehicles from the outer top of the hangar to the interior (e.g. to a level) or from the interior (e.g. from a level) to the outer top.

The manipulator arm or a control module controlling the manipulator arm can be programmed to identify, grip and/or transport either a specific or several different aircraft.

Different characteristics of unmanned aerial vehicles can include, for example, manufacturer, type and/or design.

The manipulator arm can comprise at least three joints. Possible joint types can include ball joints, hinge joints, saddle joints, egg joints and/or swivel joints. This allows the manipulator arm to be used in the hangar to secure all necessary movement ranges. In particular, the manipulator arm can be a manipulator arm with six axes, enabling manipulation of the at least one unmanned aerial vehicle in six degrees of freedom. Accordingly, it may be possible to freely change the position of the at least one unmanned aerial vehicle by translations along the three vertical axes forwards/backwards, up/down and left/right as well as its orientation by rotations around the three vertical axes, roll (rotation around the longitudinal axis), pitch (rotation around the transverse axis) and yaw (rotation around the vertical axis). Alternatively, a manipulator arm with four degrees of freedom, five degrees of freedom or seven degrees of freedom is conceivable.

It is conceivable that at least one level is arranged in the interior, which is set up to carry at least one unmanned aerial vehicle. Among other things, this allows other elements and/or modules to be arranged in the interior (for example under the plane) so that there is no collision with the manipulator arm and the other elements. In this way, damage to the manipulator arm, the other elements and/or the unmanned aerial vehicle can be avoided.

In particular, it may be further provided that the interior comprises several levels, each of which is designed to carry at least one unmanned aerial vehicle. It is thus possible for several identical or different unmanned aerial vehicles to be stored and/or transported in or out of the hangar. A hangar can therefore be used as storage and/or a base for several unmanned aerial vehicles. This has the advantage that space and costs can be reduced compared to storing one unmanned aerial vehicle in each hangar.

It may also be provided that the at least one level is designed to carry several unmanned aerial vehicles or that the several levels are designed to carry several unmanned aerial vehicles. Thus, it is possible for multiple identical or different unmanned aerial vehicles to be stored and/or transported in or out of the hangar. As described above, this has the advantage that space and costs for the storage of several unmanned aerial vehicles can be reduced compared to the storage of one unmanned aerial vehicle in each hangar.

The hangar can use the manipulator arm to place different types of unmanned aerial vehicles on the roof of the hangar, from where they can take off. In this way, several unmanned aerial vehicles of the same type can either take off one after the other to extend the area of operation or extend the duration of the mission by taking over. The use of different unmanned aerial vehicles with different sensors is also conceivable.

Furthermore, it is conceivable that the manipulator arm is additionally or alternatively set up, in particular in an automated manner, to grip and/or transport objects other than unmanned aerial vehicles into or out of the hangar and/or to transport and/or install them in the hangar. Such objects may include objects that are stored in the hangar in addition to the at least one unmanned aerial vehicle, and/or parts (e.g.) spare parts for the at least one unmanned aerial vehicle and/or consumables or objects with which the at least one unmanned aerial vehicle can be loaded. It is conceivable, for example, that consumables (e.g. rescue materials such as jettisonable floats, e.g. Restube) and/or sensors (e.g. an ultrasonic sphere for searching for missing persons below the waterline) and/or damaged or worn parts of the hangar or an unmanned aerial vehicle, e.g. landing gear, optionally including batteries, can be gripped and/or transported and/or installed by the manipulator arm. It is conceivable that the manipulator arm is set up to replenish and/or replace the consumables, sensors and/or damaged or worn parts of the unmanned aerial vehicle or hangar. Consumables can be stored in the hangar. In other words, it is possible to automatically replenish and/or replace consumables and/or spare parts (including entire replacement modules) for an unmanned aerial vehicle in the hangar. The replacement and/or refilling can be carried out using the manipulator arm or other mechanisms. It is possible to replenish and/or replace consumables and/or spare parts (including entire replacement modules) for an unmanned aerial vehicle automatically in the hangar.

It may also be provided that the outer upper surface comprises a take-off and/or landing surface for the at least one unmanned aerial vehicle. This means that no additional take-off and/or landing surface is required, which would have to be extended via a telescopic arm, for example. This saves material and the hangar comprises fewer parts that could potentially be damaged. A hangar with an opening in the at least one side part and a take-off and/or landing surface on the outer upper side makes it possible for the take-off and/or landing surface to be used as such, even if an unmanned aerial vehicle is currently being transported into or out of the interior by the manipulator arm. This is particularly advantageous if the hangar serves or is intended to serve as storage for several unmanned aerial vehicles. It is possible, for example, for an unmanned aircraft to be parked by the manipulator arm while at least one unmanned aircraft is landing on the landing area. This makes it possible, for example, to prevent damage caused by thunderstorms and/or heavy rain to the unmanned aerial vehicles and/or the interior, as well as the elements, modules and/or aircraft located therein, since a rapid clean-up/stowage of several unmanned aerial vehicles is achieved.

In general, an opening of the at least one side part and a closed top of the hangar provide protection from the weather and/or falling dirt.

The hangar can also include a temperature regulation module, which is set up to regulate the temperature inside the hangar to a pre-programmed value. This makes it possible to keep the temperature in the hangar low or high compared to the outside temperature (depending on the level of the outside temperature). This makes it possible to reduce damage caused by very high or very low temperatures to unmanned aircraft and/or modules/elements in the hangar. To determine the actual state, the temperature regulation module can include at least one thermometer inside and/or outside the hangar.

The hangar may further comprise a closure module comprising the closable opening, the closure module may be arranged to open, close, hold open or hold closed the closable opening by a flap or door. Such a locking module can enable the hangar to be open only when an unmanned aerial vehicle is actually being transported from the interior to the exterior or from the exterior to the interior. In this way, unwanted air and/or temperature exchange can be avoided. It is also possible to ensure that as little dirt and/or dust, water and/or unwanted creatures as possible enter the interior of the hangar. It is conceivable that the function of the closing module is coupled to another function of the hangar and/or its elements or modules and/or their position. For example, it is conceivable that the closing of the opening is triggered by the closing module as soon as the manipulator arm and/or an unmanned aerial vehicle gripped and/or transported with the aid of the manipulator arm is completely inside the hangar. The closing module can comprise corresponding sensors for this purpose.

In general, it is conceivable that the hangar fulfills the requirements for IP (abbreviation for International Protection) protection class IP61, IP62, IP63, IP64, IP65, IP66, IP67 or IP68 or is certified by one of these protection classes.

In particular, it is conceivable that the hangar is hermetically sealed when the opening is closed. Unwanted ingress of dirt and/or dust, water and/or moisture, heat, cold and/or living creatures (e.g. insects) can thus be prevented particularly efficiently. For example, a hangar that meets the criteria of IP protection class IP67 is conceivable here.

The hangar can also include an energy module that is set up to supply energy to at least the manipulator arm and the locking module. The energy module can, for example, comprise an energy storage device such as a battery or an accumulator, and/or one or more cables and/or a connection to a power grid. The manipulator arm and the locking module and/or other modules and/or elements can be supplied with power via the energy module. An energy storage system enables the hangar and its functions to be used at any location, regardless of an external power supply. For example, it can also be used in very remote areas such as forests, deserts, Poland, etc. It is also possible that the energy module is set up to charge the energy storage of the at least one unmanned aerial vehicle.

In particular, it is conceivable that the energy module comprises at least one solar panel and/or wind power module. The hangar can thus ensure its own energy supply, especially if the energy it produces is stored in an energy storage unit. Such a hangar is therefore independent of an external energy supply.

The hangar may also include a leveling module that is designed to automatically level the hangar after it has been set up at a location. The hangar can therefore level itself, even if it is placed on uneven ground. This enables the hangar to be positioned and set up at a location independently of human intervention.

Furthermore, the hangar can comprise a sensor module which is set up to check the take-off of the at least one unmanned aerial vehicle from the take-off and/or landing surface and/or to check and/or register the landing of at least one unmanned aerial vehicle on the take-off and/or landing surface. The sensor module may comprise, for example, a camera, an acoustic sensor and/or a pressure sensor. Such a sensor module may be connected to the closing module and/or the manipulator arm and/or other modules, so that the opening of the aperture in the at least one side wall and the activation of the manipulator arm is automatically initiated as soon as an unmanned aerial vehicle lands on the landing surface. The sensor module can transmit data to an external processor about take-off and/or landing operations and/or their success and/or failure.

In particular, it is conceivable that the sensor module is set up to monitor the operational readiness of the hangar and/or the unnamed aircraft located therein and/or to transmit the status of operational readiness (operational readiness of the hangar and/or all or individual or several unmanned aircraft) to the outside, e.g. to an external device, via a wireless connection. The hangar can use all the sensors installed in it for self-monitoring of operational readiness. It is conceivable here that an automated telematics evaluation of an unmanned aerial vehicle takes place after the mission (i.e. after the unmanned aerial vehicle has landed back on the hangar after a mission and has been stowed therein) in the sense of a post-flight check, and the status of operational readiness is based at least in part on the automated post-flight check. In particular, it is conceivable that the post-flight check is followed by an automatic replenishment and/or replacement of consumables and/or spare parts and/or spare modules of the at least one unmanned aerial vehicle, by the manipulator arm and/or other suitable mechanisms.

Together with the possibility of automatically replenishing and/or replacing consumables and/or spare parts for an unmanned aircraft in the hangar and/or the provision of several unmanned aircraft, manual intervention at the hangar installation site is reduced to a minimum. This increases flexibility and operational readiness many times over and significantly reduces manpower and personnel costs.

In particular, the hangar may further comprise a control module configured to control the at least one manipulator arm and/or the at least one locking module and/or the leveling module and/or the temperature regulation module and/or the sensing module. In particular, it is also conceivable that the control module synchronizes the manipulator arm and/or the at least one closing module and/or the levelling module and/or the temperature regulation module and/or the sensor module. Alternatively and/or additionally, it is conceivable that the aforementioned modules and/or the manipulator arm are controlled via an external control module. In particular, it is possible that the hangar and/or the above-mentioned modules and/or the manipulator arm can be connected to an external processor via at least one connection (wireless and/or cable connection) so that they can be controlled and/or programmed externally.

The size of the hangar can generally be adapted to the number of unmanned aerial vehicles stowed or to be stowed therein and/or their size and/or the storage space provided for consumables and/or spare parts and/or the modules or elements located in the hangar and/or attached to the hangar (e.g. energy module, sensor module, control module, temperature regulation module, locking module, leveling module, manipulator arm, etc.) and/or the size of the take-off and landing area.

In particular, a hangar may comprise a transportation and/or carrying and/or lifting and/or pulling device, for example one or more handles, hooks, rails, carriers, eyelets, wheels and/or rollers and/or trailers. This enables easier transportation and/or easier parking at a desired location and/or easier collection at a desired location. The place of use can thus be flexibly configured in a simple manner.

In an embodiment, the hangar and its contents have a weight of 300 kg per square meter (measured at the bottom of the hangar) or less. This can allow a hangar to be safely placed on a flat roof Furthermore, the disclosure comprises a system comprising at least two hangars. In particular, it is conceivable that the at least two hangars are connected to each other via at least one connection (wireless or cable connection). Thus, an exchange of information between the two hangars is possible. Such a hangar system is particularly advantageous if a large number of unmanned aerial vehicles (more than can be parked in a single hangar) are required at a deployment site.

Furthermore, the disclosure comprises a device which is adapted to unload a plurality of hangars from a storage and/or transportation device. The device can be controlled externally, for example, so that human intervention on site at the storage location is not necessary. This enables uncomplicated use of one or more hangars, even in places that are difficult for people to access or can only be reached with great effort.

Further details and advantages of the disclosures will now be explained with reference to the embodiments shown in more detail in the drawings.

BRIEF DESCRIPTION OF THE FIGURES

It shows.

DETAILED DESCRIPTION

Figure 1:
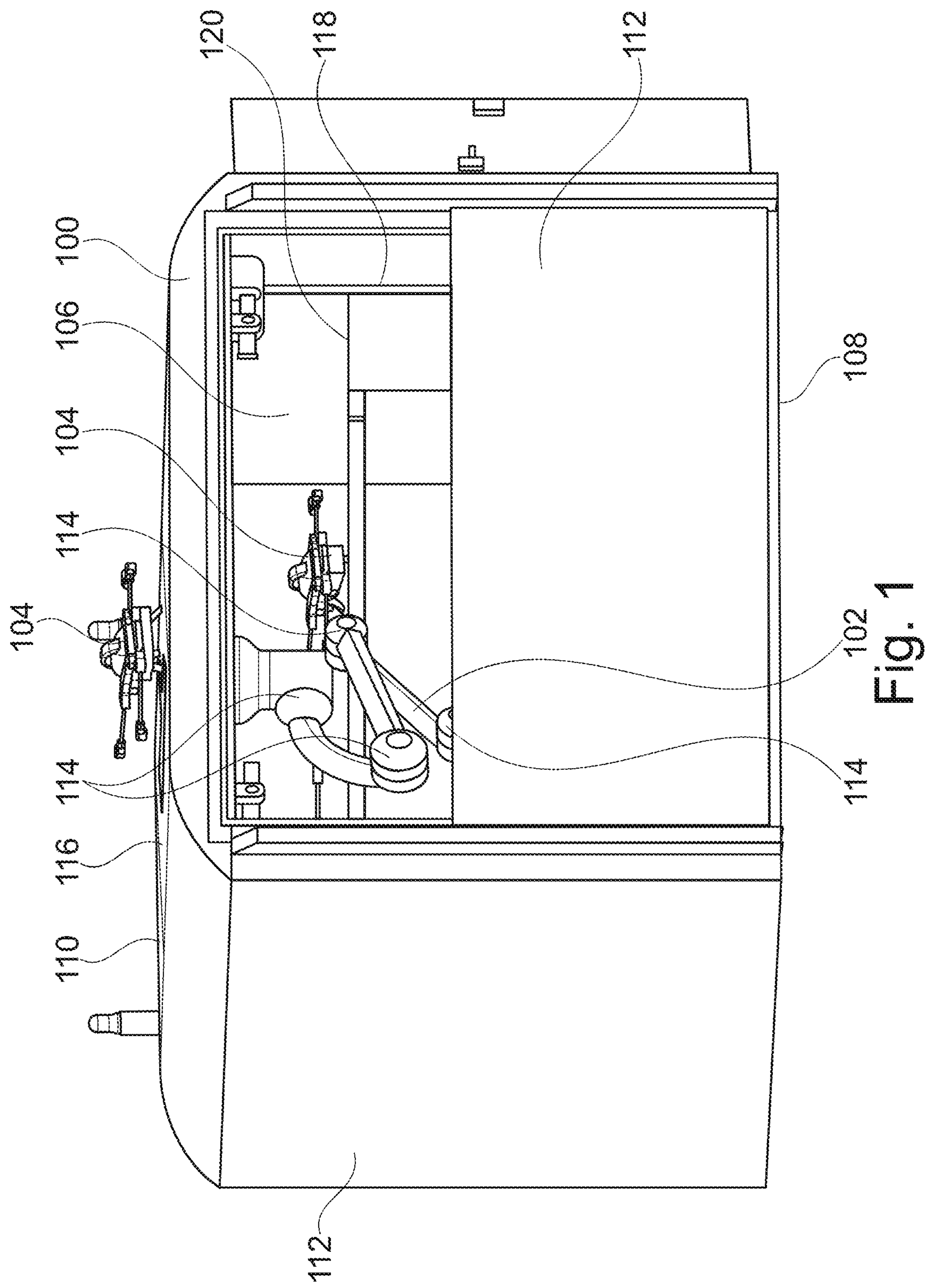
FIG. 1A perspective view of an embodiment of a hangar 100 for at least one unmanned aerial vehicle 104 according to the disclosure.

FIG. 1 shows a perspective view of an embodiment according to the disclosure of a hangar 100 for at least one unmanned aerial vehicle 104.

The hangar includes an interior 106 defined by a bottom side 108, a top side 110 and four side parts 112.

One of the side parts 112, in this embodiment example the side part on the front side 112, has a closable opening 118.

In this embodiment example, the closable opening 118 is shown in an open state.

It is not shown that the closable opening 118 can be closed by a sliding door.

In this embodiment example, a lateral side portion 112, shown on the right, has a lockable door that provides controlled access to the interior 106 and elements, modules and/or aircraft 104 contained therein, for example for maintenance. This door can be hermetically lockable.

Alternatively, only a side panel 112 would be conceivable.

In this embodiment example, the outer top side 110 comprises a take-off and/or landing surface 116 for the at least one unmanned aerial vehicle 104.

The hangar 100 further comprises a manipulator arm 102 in the interior 106.

In this embodiment example, a plane 120 is arranged in the interior 106, which carries an unmanned aerial vehicle 104.

In other words, in this embodiment example, an unmanned aerial vehicle 104 is parked and/or parked on the level 120 within the interior 106 of the hangar 100.

Further, an unmanned aerial vehicle 104 is shown on the take-off and/or landing surface 116.

In this embodiment example, the manipulator arm 102 comprises four joints 114.

Generally, the manipulator arm 102 may include three or more joints 114.

Not shown in FIG. 1 is that the hangar 100 comprises a temperature module.

Furthermore, it is not shown in FIG. 1 that the hangar 100 comprises a closing module which comprises the closable opening 118.

Not shown in FIG. 1 is that the hangar 100 comprises an energy module.

Furthermore, it is not shown that the energy module can comprise at least one solar panel and/or a wind power module.

FIG. 1 also does not explicitly show that the hangar 100 also has a leveling module.

Furthermore, it is not explicitly shown that the hangar 100 comprises a sensor module.

It is not explicitly shown that the hangar 100 also comprises a control module.

Not shown in FIG. 1 is that the characteristics of the unmanned aerial vehicle 104 include, for example, manufacturer, type, size and/or configuration.

Not shown in FIG. 1 is that the hangar 100 is part of a system of two hangars 100.

Not shown in FIG. 1 is that 14 the hangar 100 further comprises several hooks as a lifting and/or carrying and/or pulling device.

Figure 2:
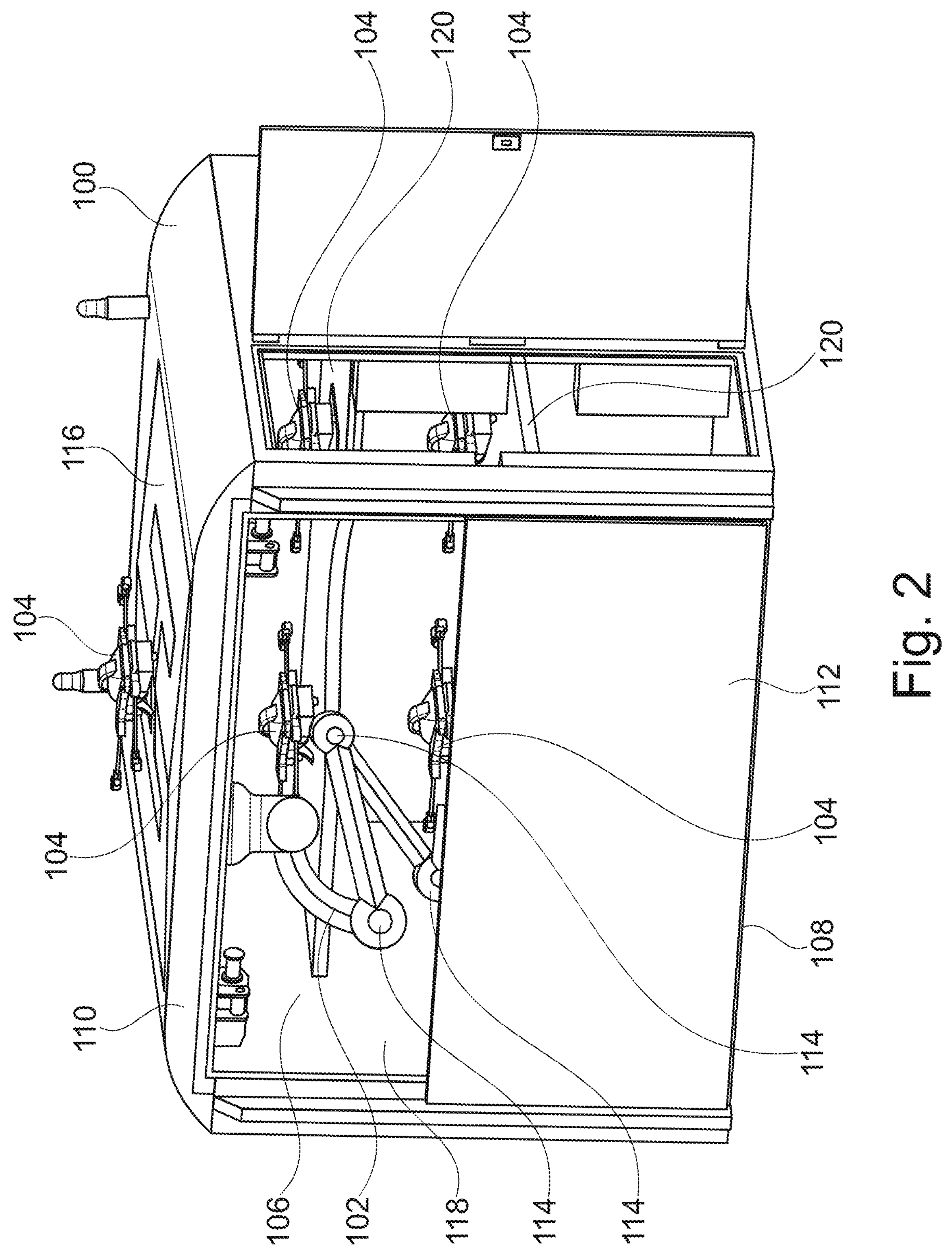
FIG. 2 a further perspective view of a hangar 100, with two levels 120 in the interior 106.

FIG. 2 shows a further perspective view of a hangar 100, with two levels 120 in the interior 106.

The depicted hangar 100 essentially corresponds in structure and function to the hangar 100 shown in FIG. 1.

In contrast to FIG. 1, FIG. 2 shows two levels 120 in the interior 106. Each of the two levels 120 carries two unmanned aerial vehicles 104.

In this embodiment example, the unmanned aerial vehicles 104 are substantially identical. Alternatively, it is possible for different aircraft 104 to be transported by the manipulator arm 102 and parked in the hangar until the appropriate deployment.

Figure 3:
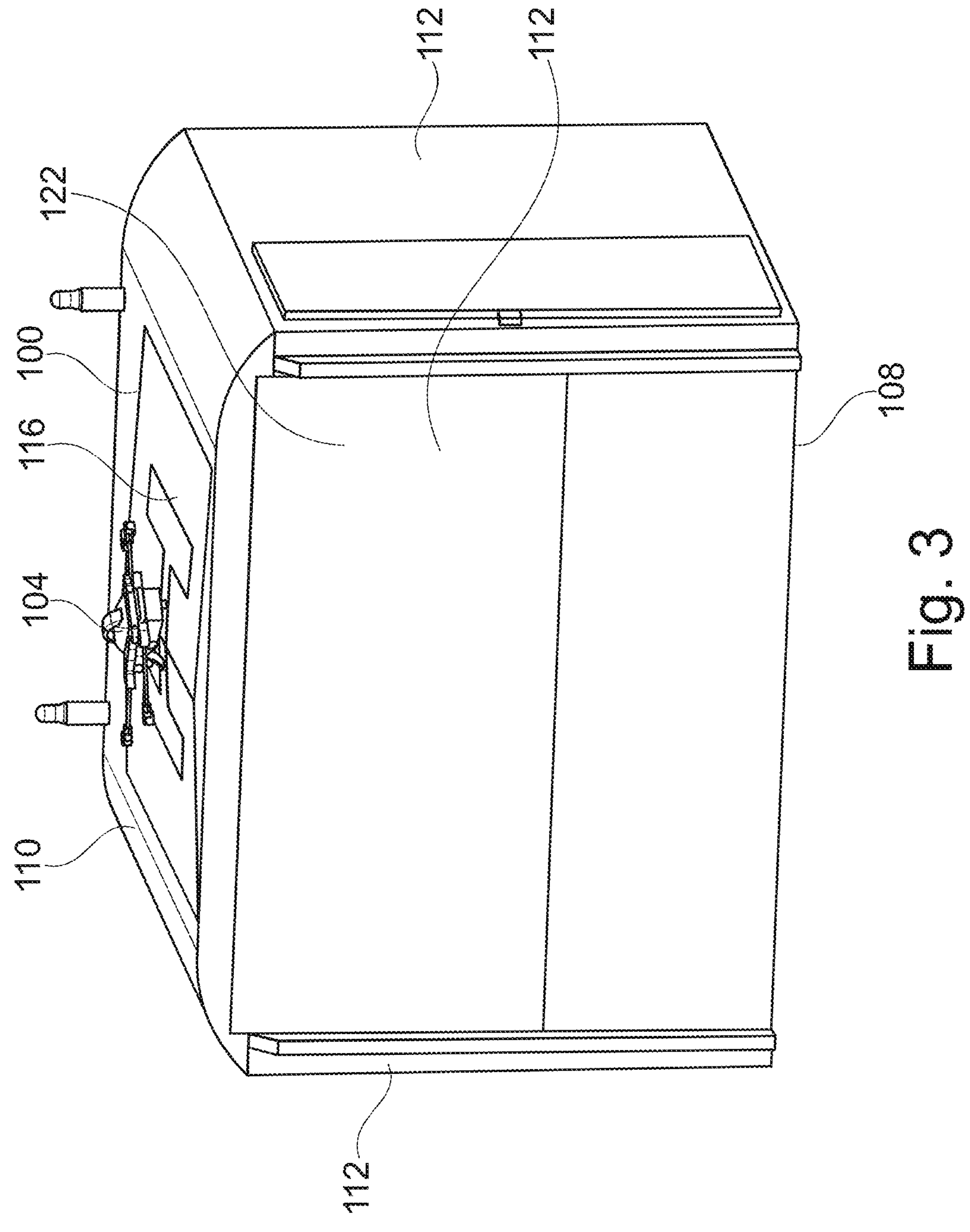
FIG. 3 a further perspective view of a hangar 100, according to FIG. 1 or FIG. 2, with closable opening 118 shown closed.

FIG. 3 shows a further perspective view of a hangar 100, according to FIG. 1 or FIG. 2, with closed opening 118.

The opening 118 in the front side section 112 was closed by a sliding door.

It is not explicitly shown that the closed Hangar 100 is hermetically sealed.

Figure 4:
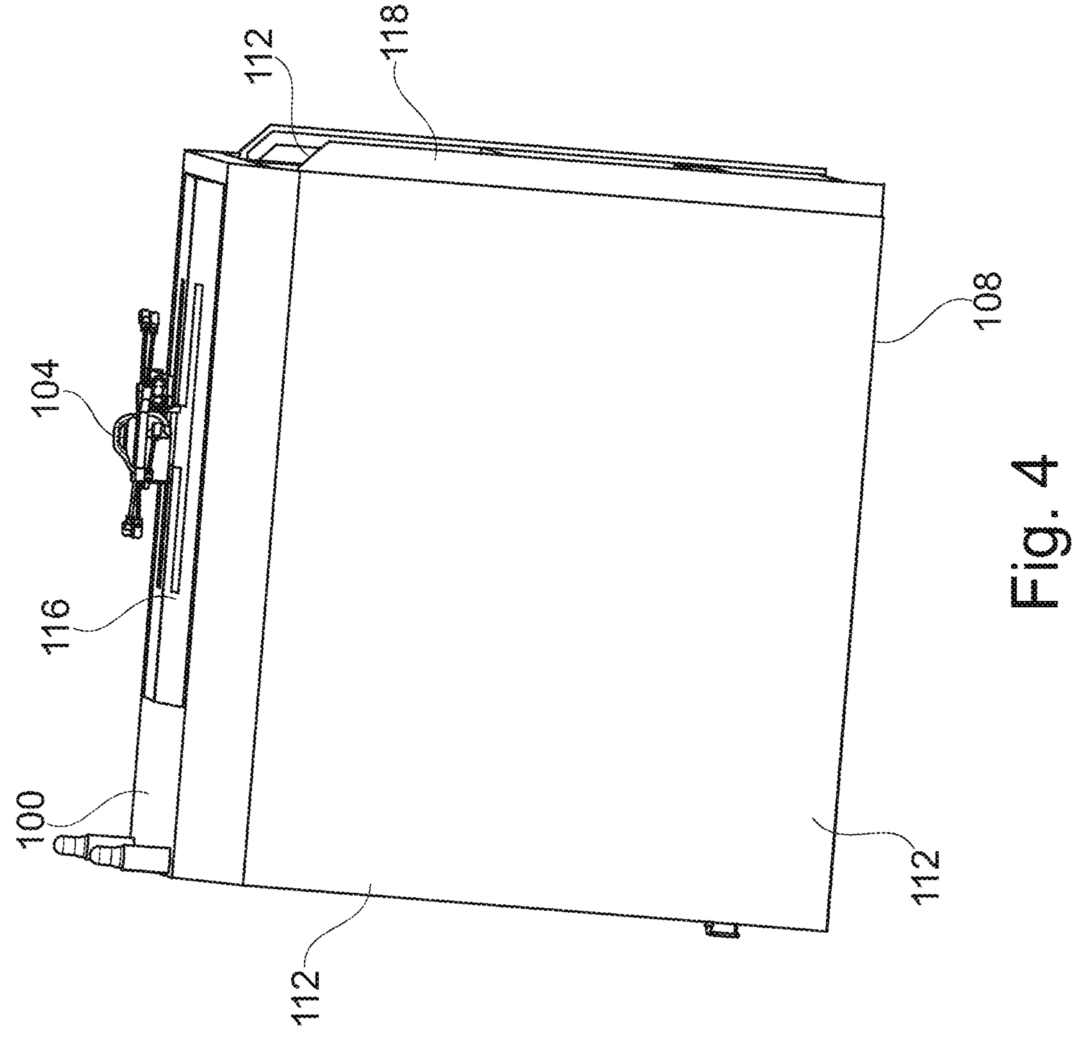
FIG. 4 a side view of a hangar 100 as shown in FIG. 3.

FIG. 4 shows a side view of a hangar 100 as shown in FIG. 3.

Figure 5:
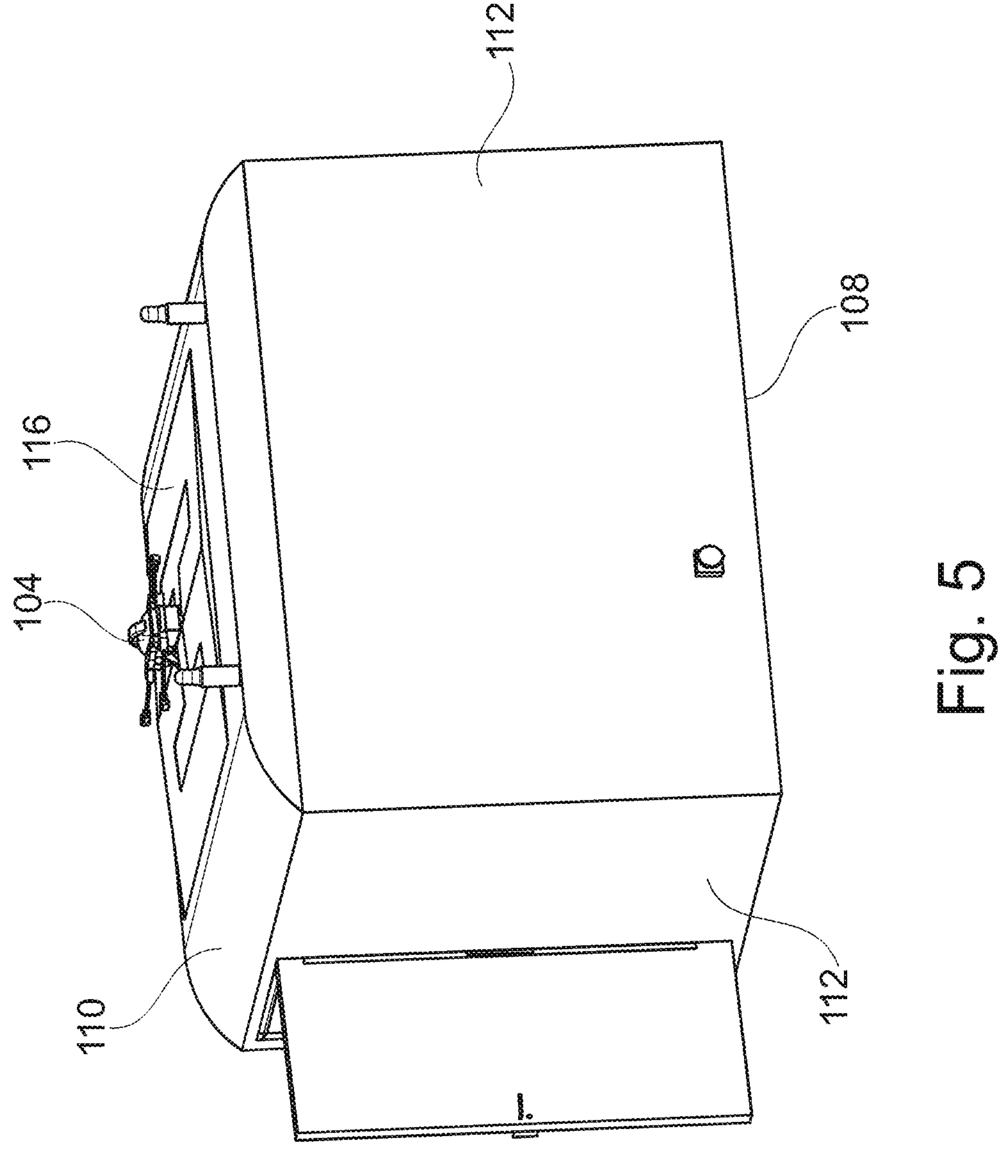
FIG. 5 a rear view of a hangar 100 according to FIG. 1 or FIG. 2.

FIG. 5 shows a rear view of a hangar 100 according to FIG. 1 or FIG. 2.

Figure 6:
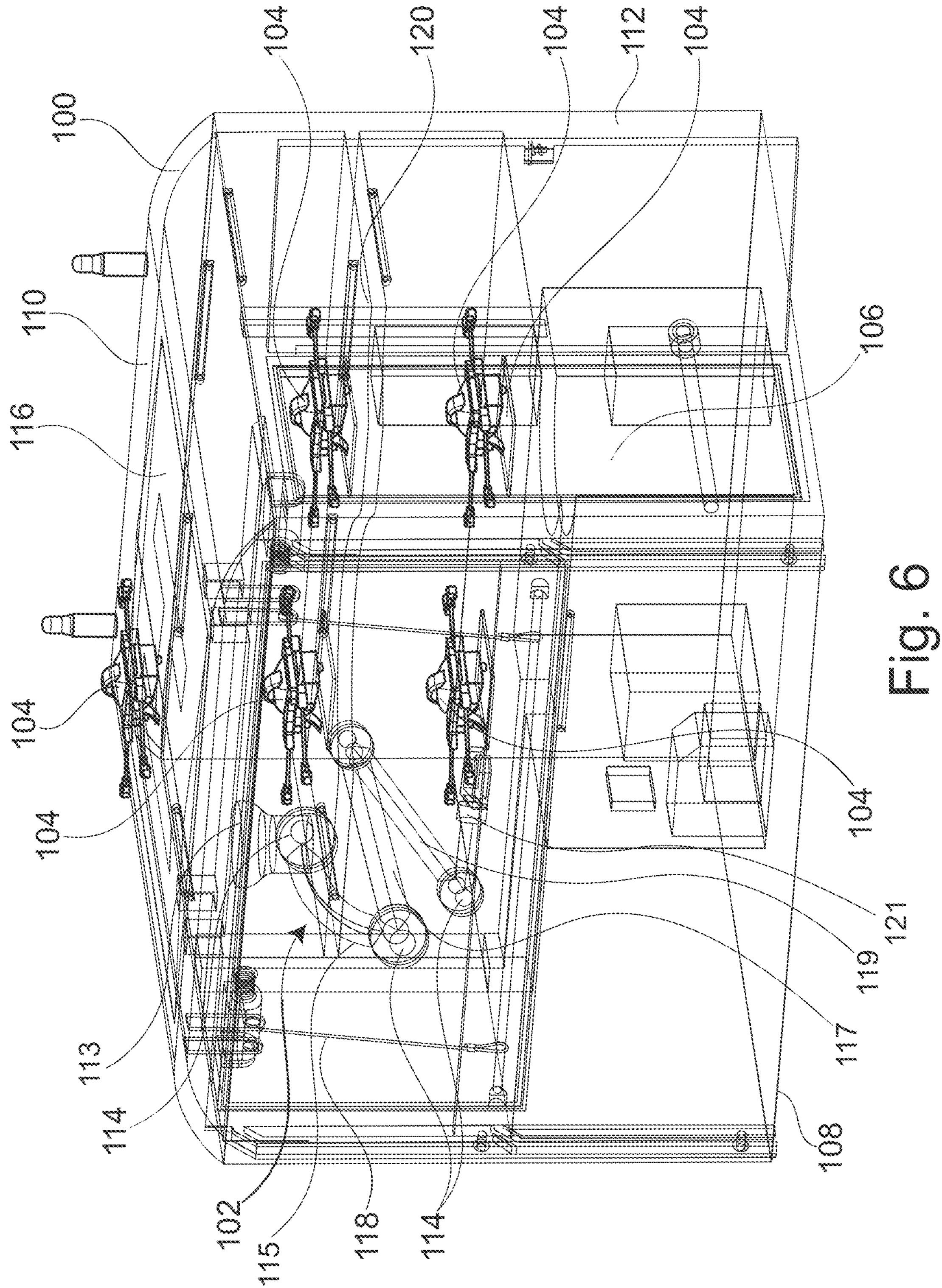
FIG. 6 a schematic, perspective view of the hangar 100 shown in FIG. 2.

FIG. 6 shows a schematic, perspective view of the hangar 100 shown in FIG. 2. The at least one manipulator arm 102 comprises at least three joints 114 comprising a first joint, a second joint, a third joint, and a fourth joint. The figure shows a fixture 113 mounted to the top side 110, a first curved link 115, a first straight link 117, a second straight link 119, and a manipulator appendage 121. In one example, the manipulator arm 102 comprises the first joint of the at least three joints rotatably coupled to the fixture 113 and to the second joint by the first curved link 115. The second joint is rotatably coupled to the third joint by the first straight link 117. The third joint is rotatably coupled to the fourth joint by the second straight link 119. The fourth joint is coupled to the manipulator appendage 121.

Figure 7:
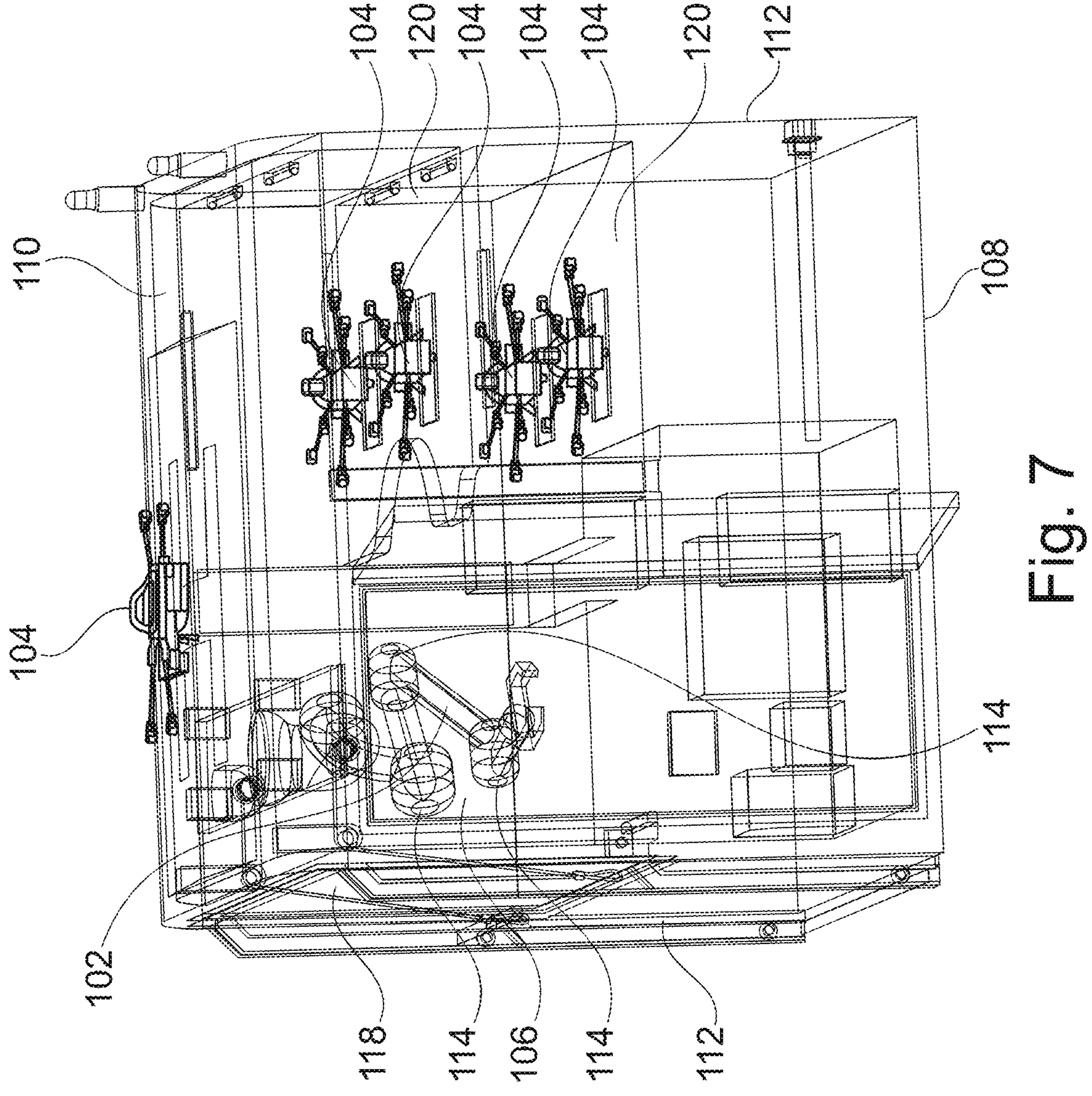
FIG. 7 a schematic, perspective view of the hangar 100 shown in FIG. 2 from the side.

FIG. 7 shows a schematic, perspective view of the hangar 100 shown in FIG. 2 from the side.

Figure 8:
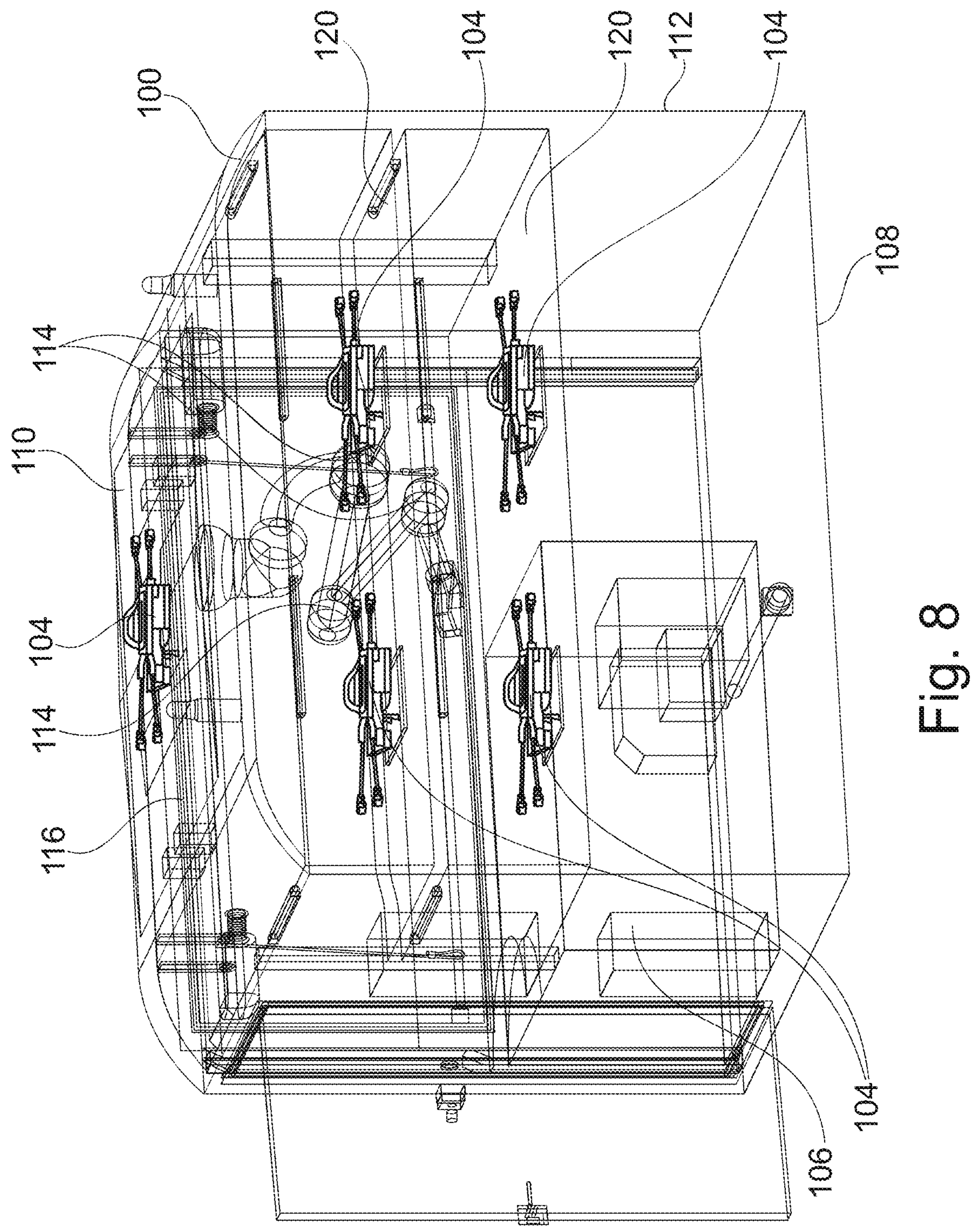
FIG. 8 a schematic, perspective view of the hangar 100 shown in FIG. 2 from the rear.

FIG. 8 shows a schematic, perspective view of the hangar 100 shown in FIG. 2 from the rear.

The function of Hangar 100 can be described as follows:

In the embodiment shown in the figures, the hangar 100 is designed as a hangar for at least one unmanned aerial vehicle 104. It can be used, for example, in drone-based water rescue and/or recovery, drone-based search, photography and running recording, weather forecasting, shipping, sporting events (e.g. drone races), agriculture, science, transportation, data collection, monitoring of critical infrastructures (KRITIS, for example energy and water supply, traffic, but also medical care), identification of pollutants, in particular with the aid of suitable sensor modules and/or border surveillance. Alternative applications are possible.

In the case of drone-based water rescue, the drone drops rescue equipment (e.g. buoyancy aids) at or near the rescue site. The drone can be refilled with rescue equipment after the mission has been completed as part of the post-flight inspection.

In the event of salvage and damage, the drone drops sensors (e.g. an ultrasonic underwater sphere) or drops sensors in the event of damage (e.g. damage caused by the chemical/pharmaceutical industry). In particular, the drone can serve as a communication hub. It is also conceivable that the hangar, to which the drone returns after the mission, could also serve as a communication hub by transmitting measurement data that is not time-critical from the drone to an external receiver via the hangar.

The structure of the hangar 100 and the manipulator arm 100 provides the necessary freedom of movement to safely park at least one unmanned aerial vehicle 104 in the hangar 100 or on the takeoff and/or landing surface 116.

The manipulator arm 102 is configured to transport an unmanned aerial vehicle 104 from a plane in the interior 106, through the closable opening 118 in the side part 112, from the interior 106 to the exterior top side 110 of the hangar 100.

Alternatively and/or additionally, the manipulator arm 102 may transport an unmanned aerial vehicle 104 on the outer top side 110, more specifically on the takeoff and or landing surface 116, through the closable opening 118 in the side part 112 from the outer top side 110 of the hangar 100 into the interior 106. In particular, the manipulator arm 102 can park the unmanned aerial vehicle 104 on a level 120. By parking multiple unmanned aerial vehicles on one (FIG. 1) or more levels 120, the hangar 100 can be used as a port and/or base and/or parking location for multiple unmanned aerial vehicles 104.

In general, the manipulator arm 102 is configured to perform transportation of one or more unmanned aerial vehicles 104, regardless of its or their characteristics.

The function of the manipulator arm 102 and/or the hangar 100 is based on the idea that the manipulator arm 102 and/or the control module can be programmed such that the manipulator arm 102 can identify and/or grab and/or transport either a specific or different embodiments of aircraft 104. In other words, the manipulator arm is programmable and adapted to transport different unmanned aerial vehicles 104 having different characteristics. The programming may be repeatedly revised and/or overhauled and/or renewed and/or supplemented. Each of the modules noted herein may include a processor and memory, wherein instructions for carrying out the specific actions described herein are stored in the memory for each respective module.

The fact that the manipulator arm 102 and/or the control module can be programmed, even repeatedly, to recognize and/or transport one or more of the same or different unmanned aerial vehicles 104 results in great flexibility. The hangar 100 and the manipulator arm 102 are thus not manufactured and designed specifically for one type of unmanned aerial vehicle 104, but are suitable for different types of unmanned aerial vehicles 104.

Generally, the control module is configured to control the at least one manipulator arm 102 and/or the at least one locking module and/or the leveling module and/or the temperature regulation module and/or the sensing module.

The closing module is arranged to open, close, keep open or keep closed the closable opening 118 by means of a flap or door 122.

The temperature control module regulates the temperature in the interior 106 to a pre-programmed value.

The energy module supplies the hangar 100, individual or all modules and/or elements, but at least the manipulator arm 102 and the locking module with energy.

The sensing module registers and/or verifies the takeoff of the at least one unmanned aerial vehicle 104 from the takeoff and/or landing surface 116 and/or the landing of the at least one unmanned aerial vehicle 104 on the takeoff and/or landing surface 116.

The leveling module automatically levels the Hangar 100 after installation at a location.

FIGS. 1-8 are drawn to scale, although other relative dimensions and positioning may be used, as desired. FIGS. 1-8 show example configurations with relative positioning of the various components. Unless otherwise noted, if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

LIST OF REFERENCE SYMBOLS

100 Hangar
102 Manipulator arm
104 Aircraft
106 Interior
108 Bottom part
110 Top part
112 Side part
114 Joint
116 Take-off/landing area
118 Opening
120 Level
122 Flap/door

The invention claimed is:

1. A hangar for at least one unmanned aerial vehicle, comprising:

an interior, which is delimited by a bottom side, a top side and at least one side part, at least one manipulator arm in the interior, wherein the at least one manipulator arm is designed to transport the at least one unmanned aerial vehicle through a closable opening in the at least one side part from the interior to an outer upper topside of the hangar, and/or wherein the at least one manipulator arm is configured to transport the at least one unmanned aerial vehicle through the closable opening in the at least one side part from the outer top side of the hangar into the interior, wherein the at least one manipulator arm is programmable and/or adapted to transport unmanned aerial vehicles which vary by one or more of manufacturer of unmanned aerial vehicle and design of unmanned area vehicle, wherein the interior comprises a second side part of the at least one side part, the second side part extending vertically between the top side and the bottom side, and a plurality of levels arranged vertically between the top side and the bottom side, each level being configured to carry at least one unmanned aerial vehicle, such that multiple unmanned aerial vehicles are stored simultaneously at different vertical heights within the interior, and wherein each level of the plurality of levels is fixed to the second side part.

2. The hangar according to claim 1, wherein the plurality of levels comprises a shelf-like structure, wherein a level of the plurality of levels comprises a first side and a free side, the first side in face sharing contact and continuous with the second side part and the free side facing the closable opening.

3. The hangar according to claim 1, wherein the at least one manipulator arm comprises:

at least three joints comprising a first joint, a second joint, a third joint, and a fourth joint;

a fixture mounted to the top side of the hangar;

a first curved link;

a first straight link;

a second straight link; and a manipulator appendage, wherein the first joint of the at least three joints is rotatably coupled to the fixture and the second joint by the first curved link, the second joint is rotatably coupled to the third joint by the first straight link, the third joint is rotatably coupled to the fourth joint by the second straight link, and the fourth joint is coupled to the manipulator appendage.

4. The hangar according to claim 1, wherein the outer top side comprises a take-off and/or landing surface for the at least one unmanned aerial vehicle.

5. The hangar according to claim 1, wherein the hangar comprises a temperature regulation module which is set up to regulate an interior temperature to a preprogrammed value.

6. The hangar according to claim 1, wherein the hangar comprises a closing module comprising the closable opening, wherein the closing module is arranged to open, close, keep open or keep closed the closable opening by a flap or door, and wherein the hangar is hermetically sealed when the closable opening is closed.

7. The hangar according to claim 1, further comprising a first height-to-width ratio of approximately 8:10 and a second height to width ratio of approximately 9:10.

8. The hangar according to claim 1, further comprising an energy module which is arranged to supply energy to the at least one manipulator arm and a closing module.

9. The hangar according to claim 8, wherein the energy module comprises at least one solar panel and/or one wind power module.

10. The hangar according to claim 1, wherein the hangar further comprises a levelling module which is set up to automatically level the hangar after installation at a location.

11. The hangar according to claim 1, wherein the hangar comprises a sensor module which is set up to check a take-off of the at least one unmanned aerial vehicle from a take-off and/or landing surface and/or to check and/or register a landing of the at least one unmanned aerial vehicle on the take-off and/or landing surface.

12. The hangar according to claim 1, wherein the hangar further comprises a control module configured to control the at least one manipulator arm and/or at least one closing module and/or a levelling module and/or a temperature regulation module and/or a sensor module.

13. The hangar according to claim 1, wherein the hangar further comprises a transport device and/or carrying device and/or lifting device and/or pulling device.

14. A system comprising at least two hangars according to claim 1.

* * * * *